US012269485B2

(12) United States Patent
Fields et al.

(10) Patent No.: US 12,269,485 B2
(45) Date of Patent: *Apr. 8, 2025

(54) MANAGING SELF-DRIVING BEHAVIOR OF AUTONOMOUS OR SEMIAUTONOMOUS VEHICLE BASED UPON ACTUAL DRIVING BEHAVIOR OF DRIVER

(71) Applicant: State Farm Mutual Automobile Insurance Company, Bloomington, IL (US)

(72) Inventors: Brian M. Fields, Normal, IL (US); Joseph P. Harr, Bloomington, IL (US); Jeremy Myers, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,776

(22) Filed: Apr. 6, 2023

(65) Prior Publication Data

US 2023/0286516 A1    Sep. 14, 2023

Related U.S. Application Data

(63) Continuation of application No. 17/848,232, filed on Jun. 23, 2022, now Pat. No. 11,623,649, which is a
(Continued)

(51) Int. Cl.
*B60W 40/09* (2012.01)
*B60W 50/00* (2006.01)
(Continued)

(52) U.S. Cl.
CPC ........ *B60W 40/09* (2013.01); *B60W 50/0098* (2013.01); *G05D 1/0088* (2013.01);
(Continued)

(58) Field of Classification Search
CPC ...... B60W 40/09; G05D 1/0088; G06Q 40/08
(Continued)

(56) References Cited

U.S. PATENT DOCUMENTS 3,919,961 A    11/1975  McDougal
6,542,076 B1    4/2003  Joao
(Continued)

FOREIGN PATENT DOCUMENTS

EP    3239686 A1    11/2017
EP    3578433 B1    8/2020
(Continued)

*Primary Examiner* — Isaac G Smith
(74) *Attorney, Agent, or Firm* — Armstrong Teasdale LLP

(57) ABSTRACT

A system and method for measuring a driver's actual driving behaviors (e.g., acceleration, deceleration) in a manual driving mode to determine their preferred driving style, and then causing an autonomous or semi-autonomous vehicle to operate itself, within limits, in accordance with the drivers' driving style when operating in a self-driving mode, thereby providing a more familiar and comfortable driving experience for the driver. Data is collected on the actual driving behavior, any pre-existing data is accessed on the actual driving behavior, and the collected data and the pre-existing data are combined. A custom control is then created based upon the combined data, and the custom control is applied to manage the self-driving behavior of the autonomous or semi-autonomous vehicle in a self-driving mode. Additional data continues to be collected on the actual driving behavior, and the custom control is adjusted based upon the collected additional data.

18 Claims, 5 Drawing Sheets

Related U.S. Application Data continuation of application No. 16/870,799, filed on May 8, 2020, now Pat. No. 11,400,945, which is a continuation of application No. 16/266,325, filed on Feb. 4, 2019, now Pat. No. 10,689,003, which is a continuation of application No. 16/000,116, filed on Jun. 5, 2018, now Pat. No. 10,239,538, which is a continuation of application No. 14/978,701, filed on Dec. 22, 2015, now Pat. No. 10,077,056.

(60) Provisional application No. 62/182,023, filed on Jun. 19, 2015, provisional application No. 62/152,573, filed on Apr. 24, 2015.

(51) Int. Cl.
*G05D 1/00* (2006.01)
*G06Q 40/08* (2012.01)

(52) U.S. Cl.
CPC ..... *G06Q 40/08* (2013.01); *B60W 2050/0075* (2013.01); *B60W 2050/0088* (2013.01); *B60W 2556/10* (2020.02); *B60W 2556/45* (2020.02)

(58) Field of Classification Search
USPC .......................................................... 701/23
See application file for complete search history.

(56) References Cited

U.S. PATENT DOCUMENTS

| | | |
|---|---|---|
| 7,975,671 B2 | 7/2011 | Perie et al. |
| 8,930,229 B2 | 1/2015 | Bowne et al. |
| 8,930,231 B2 | 1/2015 | Bowne et al. |
| 9,020,876 B2 | 4/2015 | Rakshit |
| 9,129,460 B2 | 9/2015 | McClellan et al. |
| 9,147,298 B2 | 9/2015 | Ricci |
| 9,147,353 B1 | 9/2015 | Slusar |
| 9,189,897 B1 | 11/2015 | Stenneth |
| 9,310,222 B1 | 4/2016 | Suiter et al. |
| 9,459,622 B2 | 10/2016 | Abhyanker |
| 9,475,496 B2 | 10/2016 | Attard et al. |
| 9,506,763 B2 | 11/2016 | Averbuch et al. |
| 9,646,428 B1 | 5/2017 | Konrardy et al. |
| 9,715,711 B1 | 7/2017 | Konrardy et al. |
| 9,754,325 B1 | 9/2017 | Konrardy et al. |
| 9,754,501 B2 | 9/2017 | Stenneth |
| 9,766,625 B2 | 9/2017 | Boroditsky et al. |
| 9,767,516 B1 | 9/2017 | Konrardy et al. |
| 9,792,656 B1 | 10/2017 | Konrardy et al. |
| 9,805,423 B1 | 10/2017 | Konrardy et al. |
| 9,830,748 B2 | 11/2017 | Rosenbaum |
| 9,852,475 B1 | 12/2017 | Konrardy et al. |
| 9,858,621 B1 | 1/2018 | Konrardy et al. |
| 9,940,676 B1 | 4/2018 | Biemer |
| 9,940,834 B1 | 4/2018 | Konrardy et al. |
| 9,946,531 B1 | 4/2018 | Fields et al. |
| 9,990,782 B2 | 6/2018 | Rosenbaum |
| 10,023,114 B2 | 7/2018 | Adams et al. |
| 10,024,960 B2 | 7/2018 | Brandt |
| 10,026,130 B1 | 7/2018 | Konrardy et al. |
| 10,049,408 B2 | 8/2018 | Carver et al. |
| 10,077,056 B1 | 9/2018 | Fields et al. |
| 10,126,756 B2 | 11/2018 | Boyer et al. |
| 10,134,091 B2 | 11/2018 | Adams et al. |
| 10,154,130 B2 | 12/2018 | Abramson et al. |
| 10,185,998 B1 | 1/2019 | Konrardy et al. |
| 10,239,538 B1 | 3/2019 | Fields et al. |
| 10,269,190 B2 | 4/2019 | Rosenbaum |
| 10,319,039 B1 | 6/2019 | Konrardy et al. |
| 10,324,463 B1 | 6/2019 | Konrardy et al. |
| 10,373,259 B1 | 8/2019 | Konrardy et al. |
| 10,467,824 B2 | 11/2019 | Rosenbaum |
| 10,689,003 B1 | 6/2020 | Fields et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2003/0016130 A1 | 1/2003 | Joao |
| 2003/0169173 A1 | 9/2003 | Longere |
| 2005/0247513 A1 | 11/2005 | Turner |
| 2007/0027583 A1 | 2/2007 | Tamir et al. |
| 2012/0083960 A1 | 4/2012 | Zhu et al. |
| 2012/0280835 A1 | 11/2012 | Raz et al. |
| 2013/0218604 A1 | 8/2013 | Hagelstein et al. |
| 2013/0304513 A1* | 11/2013 | Hyde ................ G06Q 40/08 705/4 |
| 2013/0304514 A1 | 11/2013 | Hyde et al. |
| 2014/0162219 A1 | 6/2014 | Stankoulov |
| 2014/0244125 A1* | 8/2014 | Dorum ................ B60W 40/12 701/1 |
| 2014/0253376 A1 | 9/2014 | Large et al. |
| 2014/0309870 A1 | 10/2014 | Ricci et al. |
| 2015/0088550 A1 | 3/2015 | Bowers et al. |
| 2015/0141043 A1 | 5/2015 | Abramson et al. |
| 2015/0149017 A1* | 5/2015 | Attard ............ B60W 30/18163 701/23 |
| 2015/0158469 A1 | 6/2015 | Cheatham et al. |
| 2015/0158495 A1 | 6/2015 | Duncan et al. |
| 2015/0160653 A1 | 6/2015 | Cheatham et al. |
| 2015/0161894 A1 | 6/2015 | Duncan et al. |
| 2015/0170287 A1 | 6/2015 | Tirone et al. |
| 2015/0187019 A1 | 7/2015 | Fernandes et al. |
| 2015/0346722 A1 | 12/2015 | Herz et al. |
| 2016/0059865 A1 | 3/2016 | Ricci |
| 2016/0086285 A1 | 3/2016 | Jordan et al. |
| 2016/0151288 A1 | 6/2016 | Oshlack et al. |
| 2016/0159350 A1* | 6/2016 | Pilutti ................ B60W 30/143 701/23 |
| 2016/0163217 A1 | 6/2016 | Harkness |
| 2016/0203560 A1 | 7/2016 | Parameshwaran |
| 2016/0332567 A1 | 11/2016 | Wilson et al. |
| 2018/0130095 A1 | 5/2018 | Khoury |
| 2018/0134410 A1 | 5/2018 | Fymat |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | | |
|---|---|---|---|
| EP | 3730375 B1 | 10/2021 | |
| EP | 3960576 A1 | 3/2022 | |
| EP | 4190659 A1 | 6/2023 | |
| EP | 4190660 A1 | 6/2023 | |
| WO | 2015/034417 A1 | 3/2015 | |
| WO | 2015/134376 A1 | 9/2015 | |
| WO | WO-2015134417 A1 * | 9/2015 | ......... A61B 5/02055 |

* cited by examiner

MANAGING SELF-DRIVING BEHAVIOR OF AUTONOMOUS OR SEMIAUTONOMOUS VEHICLE BASED UPON ACTUAL DRIVING BEHAVIOR OF DRIVER

RELATED APPLICATIONS

The present application is a continuation of, and claims the benefit of, U.S. patent application Ser. No. 17/848,232, entitled "Managing Self-Driving Behavior of Autonomous or Semi-autonomous Vehicle Based Upon Actual Driving Behavior of Driver" and filed Jun. 23, 2022, which is a continuation of U.S. patent application Ser. No. 16/870,799 (now U.S. U.S. Pat. No. 11,400,945), entitled "Managing Self-Driving Behavior of Autonomous or Semi-autonomous Vehicle Based Upon Actual Driving Behavior of Driver" and filed May 8, 2020, which is a continuation of U.S. patent application Ser. No. 16/266,325, (now U.S. Pat. No. 10,689,003) entitled "Managing Self-Driving Behavior of Autonomous or Semi-autonomous Vehicle Based Upon Actual Driving Behavior of Driver" and filed Feb. 4, 2019, which is a continuation of U.S. patent application Ser. No. 16/000,116, (now U.S. Pat. No. 10,239,538) entitled "Managing Self-Driving Behavior of Autonomous or Semi-autonomous Vehicle Based Upon Actual Driving Behavior of Driver" and filed Jun. 5, 2018, which is a continuation of and claims the benefit of U.S. patent application Ser. No. 14/978,701. (now U.S. Pat. No. 10,077,056) entitled "Managing Self-Driving Behavior of Autonomous or Semi-autonomous Vehicle Based Upon Actual Driving Behavior of Driver." filed Dec. 22, 2015, which claims priority benefit of an earlier-filed U.S. provisional patent application entitled "Managing Self-Driving Behavior of Autonomous Vehicle Based Upon Actual Driving Behavior of Driver," Ser. No. 62/152,573, filed Apr. 24, 2015, and also claims priority benefit of a second earlier-filed U.S. provisional patent application entitled "Managing Self-Driving Behavior of Autonomous Vehicle Based Upon Actual Driving Behavior of Driver." Ser. No. 62/182,023, filed Jun. 19, 2015. The contents of the identified earlier-filed applications are hereby incorporated by reference into the present application as if set forth in their entireties.

FIELD OF THE INVENTION

The present disclosure generally relates to systems and methods for controlling self-driving vehicles, and, more particularly, to systems and methods for measuring the actual driving behaviors of drivers and then managing the self-driving behaviors of self-driving vehicles to, within limits, mimic the measured actual driving behaviors

BACKGROUND

Autonomous vehicles may become more prevalent in the future. However, autonomous vehicles may be typically programmed to operate or drive in real world conditions in a style that is substantially different than that of an individual driver. Thus, the driving style of an autonomous vehicle may be upsetting or uncomfortable to numerous drivers that are used to driving themselves. This may, in turn, lower an average driver's confidence or interest in riding as a passenger in an autonomous vehicle.

BRIEF SUMMARY

The present embodiments may relate to, inter alia, a system and method configured to objectively measure a driver's actual driving behaviors in a manual driving mode to determine their preferred driving style, and then cause a self-driving vehicle to operate itself, within limits, in accordance with a substantially similar driving style when in a self-driving mode, thereby providing a more familiar and comfortable driving experience for the driver.

In one aspect, a system may be provided for managing the self-driving behavior of the self-driving vehicle. The system may broadly comprise a communication element configured to receive and transmit signals via a network, a memory element configured to store information, and a processing element configured to perform the following steps or actions. Data may be collected regarding the actual driving behavior of the driver in the manual driving mode, pre-existing data may be accessed regarding the actual driving behavior of the driver in the manual driving mode, and the collected data may be combined. A custom control may be created based upon the combined collected and accessed pre-existing data, and the custom control may be applied to manage the self-driving behavior of the self-driving vehicle in a self-driving mode. Additional data may continue to be collected regarding the actual driving behavior of the driver in the manual driving mode, and the custom control may be adjusted based upon the collected additional data. The system and the steps or actions it performs may include additional, fewer, or alternative components or steps or actions, including those discussed elsewhere herein.

In another aspect, a computer-implemented method may be provided for managing the self-driving behavior of the self-driving vehicle. The computer-implemented method may broadly comprise the following steps or actions. Data may be collected regarding the actual driving behavior of the driver in the manual driving mode, pre-existing data may be accessed regarding the actual driving behavior of the driver in the manual driving mode, and the collected data and the accessed pre-existing data may be combined. A custom control may be created based upon the combined data, and the custom control may be applied to manage the self-driving behavior of the self-driving vehicle in the self-driving mode. Additional data may continue to be collected regarding the actual driving behavior of the driver in the manual driving mode, and the custom control may be adjusted based upon the collected additional data. The computer-implemented method may include additional, fewer, or alternative steps or actions, including those discussed elsewhere herein.

In another aspect, a non-transitory computer-readable medium with an executable program stored thereon may be provided for managing the self-driving behavior of the self-driving vehicle. The program may broadly instruct the processing element of the system to perform the following steps or actions. Data may be collected regarding the actual driving behavior of the driver in the manual driving mode, pre-existing data may be accessed regarding the actual driving behavior of the driver in the manual driving mode, and the collected data and the accessed pre-existing data may be combined. A custom control may be created based upon the combined data, and the custom control may be applied to manage the self-driving behavior of the self-driving vehicle in the self-driving mode. Additional data may continue to be collected regarding the actual driving behavior of the driver in the manual driving mode, and the custom control may be adjusted based upon the collected additional data. The program stored on the non-transitory computer-readable medium may include additional, fewer, or alternative instructions, including those discussed elsewhere herein.

Each of the aforementioned aspects may further include any one or more of the following additional or alternative features. The actual driving behavior may be acceleration, deceleration, lane-changing, speed of cornering, and speed management. Collecting data may involve using one or more sensors to measure the actual driving behavior. The collected data may include a location and a time at which the measured actual driving behavior occurred. Anomalous data may be deleted from the combined data. The custom control may be a performance threshold for the self-driving behavior. Creating and applying the custom control may include not allowing the custom control to exceed a limit. The limit may be based upon such information as driving conditions, driving circumstances, driving laws, parental preferences, employer preferences, and vehicle owner preferences. The steps or actions may further include collecting driving behavior data of a plurality of drivers driving through a particular area and/or at a particular time, determining a safe operating range for driving through the particular area and/or at the particular time based upon the collected driving behavior data of the plurality of drivers, and basing the limit on the determined safe operating range.

Applying the custom control may include identifying a change in the actual driving behavior of the driver in the manual driving mode associated with a particular location and/or a particular time, and adjusting the custom control to reflect the change in the actual driving behavior of the driver when the self-driving vehicle is operating in the self-driving mode at the particular location and/or at the particular time. The steps or actions may further include allowing the driver to transfer the custom control from the self-driving vehicle to a second self-driving vehicle. The steps or actions may further include creating a plurality of custom controls for a plurality of different drivers of the self-driving vehicle, with each custom control being associated with each different driver, identifying a particular driver using the self-driving vehicle from the plurality of different drivers, and applying a particular custom control associated with the identified particular driver from the plurality of custom controls. Adjusting the custom control may be performed periodically or continuously. The steps or actions may further include adjusting an insurance rate based upon the custom control for the self-driving vehicle. The steps or actions may further include allowing the driver to manually adjust the custom control, and basing the insurance rate on the manually adjusted custom control and an amount of time spent in the self-driving mode.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown, wherein.

Figure 1:
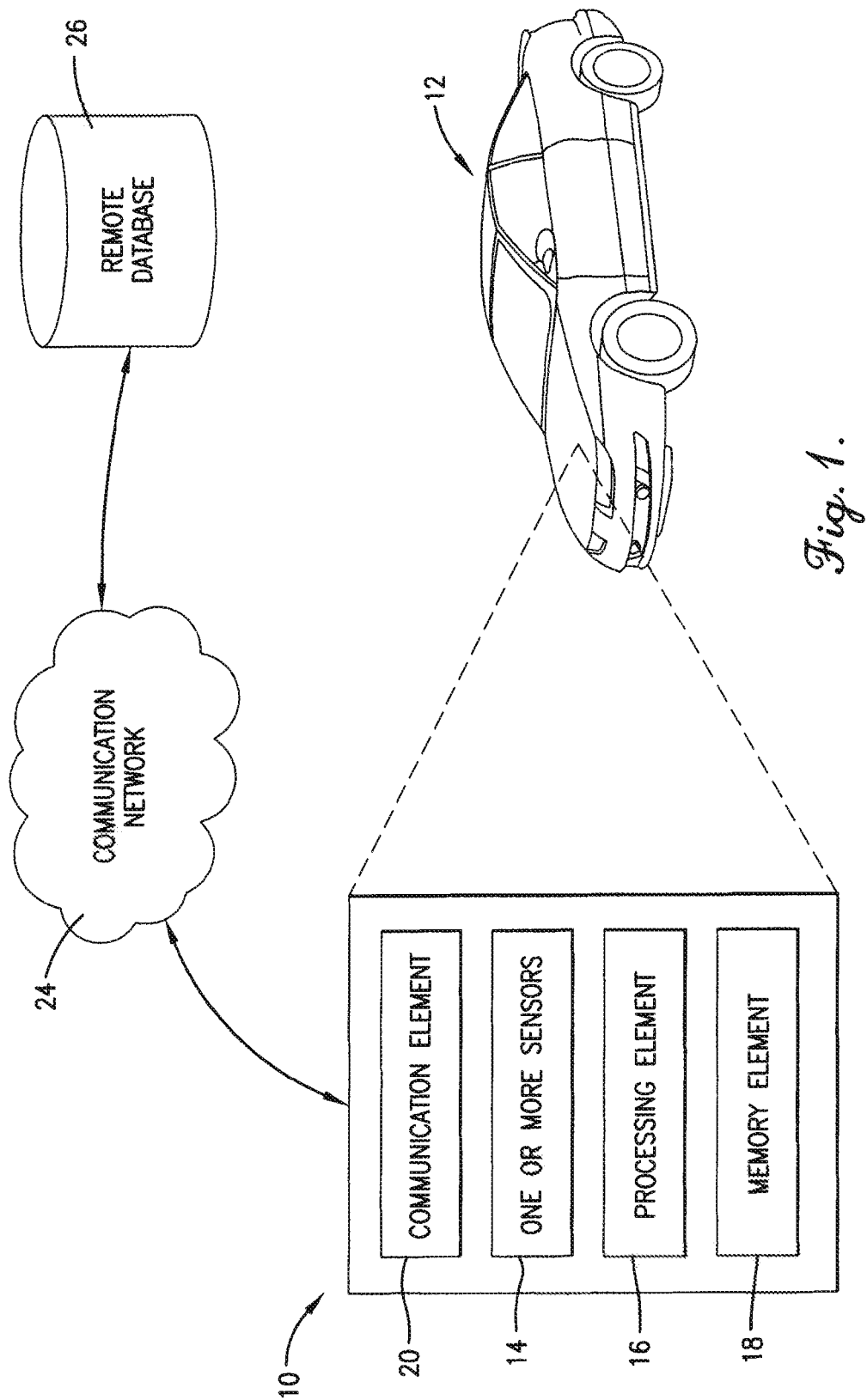
FIG. 1 is a depiction of an embodiment of an exemplary system for managing the self-driving behavior of a self-driving vehicle.

The Figures depict preferred embodiments for purposes of illustration only. One skilled in the art will readily recognize from the following discussion that alternative embodiments of the systems and methods illustrated herein may be employed without departing from the principles of the embodiments described herein.

DETAILED DESCRIPTION

The present embodiments relate to, inter alia, creating and using an objective measure of driving behavior as input to an autonomous (or semi-autonomous) vehicle driving system to match an individual driver's behavior and driving style to the autonomous vehicle's automated control system. A system and method may use a driver feedback scoring algorithm that provides an overall score as well as separate scores for acceleration, braking, cornering, and/or other driving behavior metrics at the trip level to objectively quantify the driving patterns, styles, and/or behaviors of individual drivers in defined driving environments and/or situations. The driving scores may serve as input to automated vehicle control systems to correlate automated vehicle controls of acceleration, braking, cornering, and/or other driving behavior to deliver safe levels, as well as to closely mimic actual driver behavior. This approach may offer drivers a similar driving experience with automated driving systems so they can have more confidence and familiarity behind the wheel or riding in autonomous or semi-autonomous vehicles.

The present embodiments may enable new objective standards for safe driving behaviors that vehicle manufacturers may use to tune and code automated driving systems in partially or fully autonomous vehicles. The present embodiments may also enable auto manufacturers to establish a safe operating range for automated driving systems for acceleration, braking, cornering, and/or other driving characteristics based upon auto insurance provider (or other) driving behavior scoring metrics and/or driving behavior/telematics data.

In one aspect, telematics and/or driving behavior data may be collected regarding an insured driver's behavior with their permission. The telematics and/or driving behavior data collected may relate to the insured's typical acceleration, braking, cornering, speed, following distance, and/or other aspects of individual driving style. An object measure of driving behavior may be a range (or model) of driving behavior. The range of driving behavior may be entered into an autonomous or semi-autonomous vehicle control system. As a result, the autonomous or semi-autonomous vehicle may mimic that driving behavior of the insured to provide a better customer experience for autonomous or semi-autonomous vehicles users/owners.

A safe operating range for a number of driving behaviors or characteristics (acceleration, braking, cornering, speed, following distance, etc.) may be determined. For example, a normal safe driving range for each driving characteristic may be determined using various factors (e.g., g-force measurements for acceleration, braking, or turning).

If the insured's typical driving behavior for a specific driving characteristic is within the determined normal range, the driving mode of the automated vehicle may include a setting set at, or adjusted to, the insured's typical driving behavior for that driving characteristic. On the other hand, if the insured's typical driving behavior for a specific driving characteristic is not within an acceptable range for safe driving, the driving mode of the automated vehicle may include a setting set at, or adjusted to, an upper or lower limit or threshold for the acceptable range.

For example, if the insured typically exhibits normal acceleration and braking, the autonomous vehicle driving mode may be set to mimic the insured's driving for vehicle acceleration and braking. On the other hand, if the insured typically drives over the speed limit or otherwise outside the range for safe driving speed, the automated vehicle driving mode may include a setting or adjustment such that the vehicle automatically drives within the speed limit and/or at a safe driving speed for road conditions. For example, some or all of the driving characteristics may have acceptable speeds or g-forces. If the driver typically exceeds those speed or g-force thresholds, automated vehicle operation may be limited to the acceptable speeds or g-forces for vehicle safety.

In one embodiment, a smart vehicle controller may have a display screen that allows a human passenger to select a type of driving mode for an autonomous or semi-autonomous vehicle. For example, a display screen may present several driving modes to the passenger for selection, such as (1) Conservative Driver, (2) Normal Driver, (3) Aggressive Driver, and/or (4) My Driving Profile. The My Driving Profile may direct the autonomous vehicle to be driven (by a smart vehicle controller or other processors) in a fashion that mimics the typical driving behavior of the passenger. The autonomous or semi-autonomous vehicle may be driven automatically (under processor control) in a manner that corresponds to the mode selected, such as conservative, normal, aggressive, or in accordance with a driver profile.

An insurance provider may collect data from the insured's mobile device, telematics device, or an automated vehicle controller related to an amount of time that the insured rides in the autonomous vehicle for each driving mode Based upon the amount of miles driven in each mode, usage-based auto insurance may be updated. For instance, an auto insurance policy, premium, rate, or discount may be based upon the amount of time or miles that the insured has the autonomous or semi-autonomous vehicle set at each different driving mode (conservative, aggressive, normal, My Driving Profile, etc.). For example, an insured that typically sets their autonomous vehicle to a normal or conservative driving mode may be offered a discount on auto insurance.

Exemplary Embodiments

Figure 2:
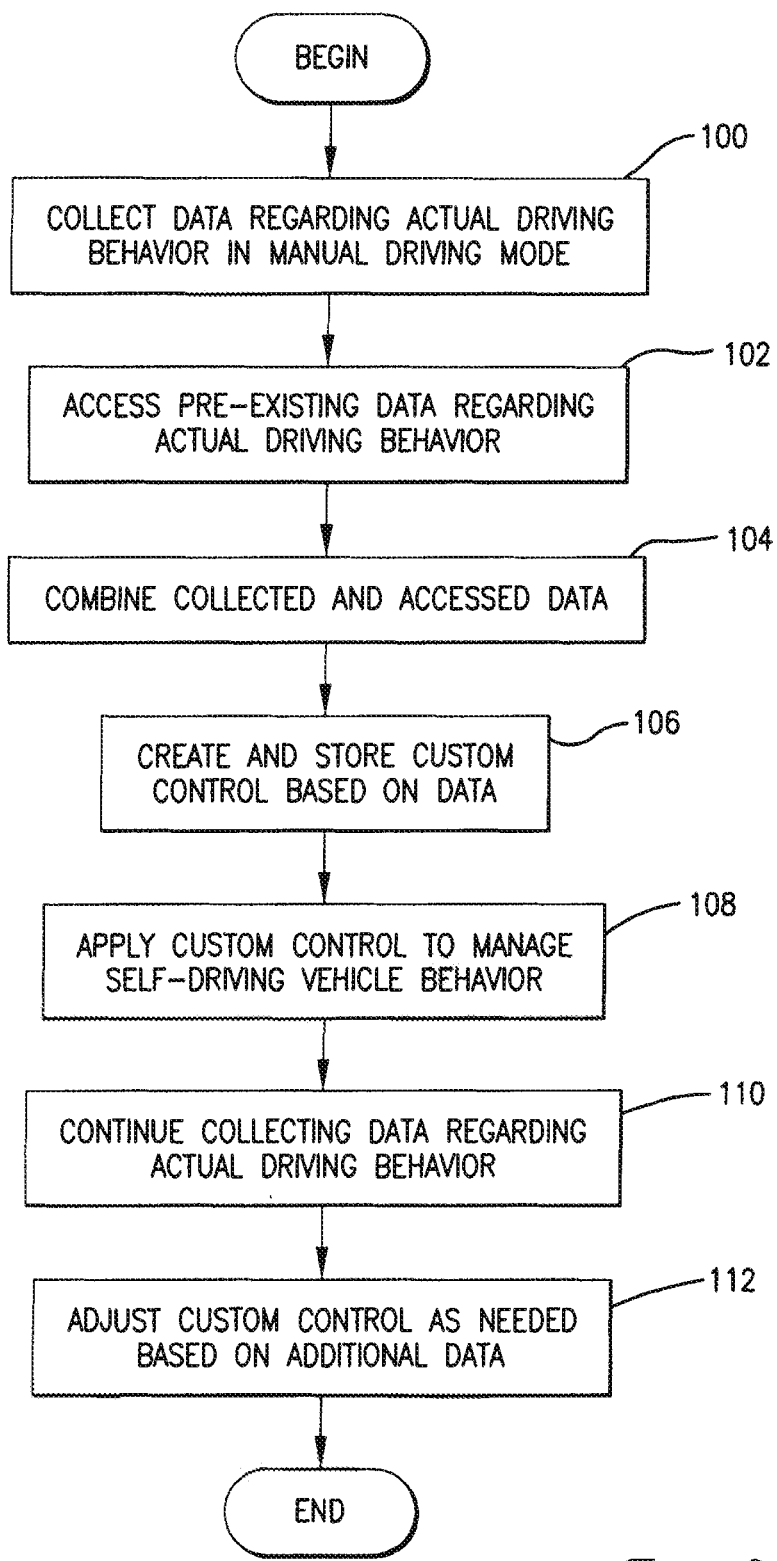
FIG. 2 is a first flowchart of exemplary steps or actions that may be performed by the system of FIG. 1.

Referring to FIGS. 1 and 2, the present embodiments may relate to a system 10 and method configured to objectively measure a driver's actual driving behaviors in a manual driving mode to determine their preferred driving style, and then cause a self-driving vehicle 12 to operate itself, within limits, in accordance with a substantially similar driving style when in self-driving mode, thereby providing a more familiar and comfortable driving experience for the driver.

The system 10 may collect data regarding the actual driving behaviors of the driver in the manual driving mode, as shown in step 100. In one implementation, one or more sensors 14 measure one or more indicia of the actual driving behaviors, and communicate the one or more measurements to a processing element 16 and/or to a memory element 18. In one implementation, the data may include location and/or time data regarding a plurality of locations and/or times at which the measured actual driving behaviors took place.

The system 10 may access any pre-existing data regarding the actual driving behaviors of the driver in the manual driving mode, as shown in step 102. Such pre-existing data may be stored on the system's 10 own memory element 18 or may be remotely accessed via a communication element 20, and may have been originally collected for the same or a different purpose. The system 10 may combine the collected and pre-existing data regarding the actual driving behaviors of the driver in manual driving mode, as shown in step 104. Combining such data may provide a larger and therefore more accurate sample of the driver's actual driving behaviors.

The system 10 may create performance thresholds or other custom controls based upon the data regarding the driver's actual driving behaviors, as shown in step 106. The performance thresholds or other custom controls may be used to manage the self-driving behavior of the self-driving vehicle 12. In one implementation, anomalous data may be deleted from the data set. In one implementation, the system 10 may impose limits on the performance thresholds or other custom controls so as not to exceed legal or otherwise safe minimums or maximums, regardless of whether or not the driver may have exceeded such limits in manual driving mode (i.e., the system 10 may delete or otherwise ignore data that exceed these limits). Such limits may be dynamically adjustable in response to driving conditions (e.g., road construction, accidents, different jurisdictional limits, severe weather, and/or other unusual driving conditions), circumstances (e.g., near schools), local laws (e.g., different limits imposed by different jurisdictions), and/or other sources of limits (e.g., parents imposing different self-driving behavior limits when their children are using the vehicles, employers imposing self-driving behavior limits when their employees are using the vehicles, and/or vehicle owners imposing self-driving behavior limits when they allow others to use the vehicles). Relatedly, objective measurements of the manual driving behaviors of an individual or a group of individuals driving through particular areas at particular times may be collected, analyzed, and used to establish safe operating ranges for some or all self-driving vehicles operating within those areas during those times.

The system 10 may apply the performance thresholds or other custom controls to manage the self-driving behavior of the vehicle 12 in real-time, as shown in step 108. In one implementation, the system's 10 application of the performance thresholds or other custom controls may take into account the location and/or time if the system 10 has determined that particular locations and/or times are associated with changes in the driver's self-driving behavior. For example, the driver may drive more aggressively in the morning on the way to work than in the evening on the way home, or the driver may drive more aggressively on open highways or during off-peak driving times and less aggressively on residential streets or during peak driving times.

The system 10 may, for example, create and apply different custom controls for different locations and/or times, or may create a default custom control and adjust it for different locations and/or times when applying it.

In one implementation, the system 10 may allow for transferring manual driving data or corresponding self-driving custom controls from one vehicle 12 to another, such as from the driver's primary vehicle to a new, borrowed, or rented vehicle.

In one implementation, data may be collected and custom controls may be created for multiple drivers of the same vehicle 12, and the system 10 may determine which particular driver of a plurality of potential drivers is in the vehicle 12 and then apply the custom controls created for that particular driver. More specifically, the system 10 may be driver-specific rather than vehicle-specific, i.e., it may change the vehicle's 12 self-driving behavior to reflect the different manual driving styles of different drivers, such as family members who share the vehicle 12.

The system 10 may continue to collect data regarding the actual driving behaviors of the driver in manual driving mode, as shown in step 110. As appropriate, the system 10 may adjust the performance thresholds or other custom controls based upon the additional collected data, as shown in step 112. Such adjustment may occur periodically, such as at fixed intervals or whenever warranted, or substantially continuously.

Additionally, just as insurance rates may be adjusted based upon measured actual driving behaviors, insurances rates may be similarly adjusted based upon the self-driving vehicle's 12 self-driving behavior. Relatedly, the driver may be allowed to select a different self-driving style than the driver normally exhibits when manually driving the vehicle 12, and this choice may be used to adjust the driver's insurance rate, deductible amount, or other insurance term or condition based upon the lower or higher aggressiveness of the selected driving style when in self-driving mode and the amount of time spent in self-driving mode.

Potential implementations of features of the present embodiments, including the data collection and custom control creation features, are described in U.S. Pat. Nos. 8,930,229 and 8,930,231, the entire contents of which are incorporated by reference herein. In particular, State Farm's Driver Feedback Scoring Algorithm provides an overall score and specific scores for acceleration, braking, and cornering at the trip level in order to objectively quantify driving patterns, styles, and behaviors in defined driving environments and situations. These scores may then be used to tune and code self-driving vehicles 12 so that self-driving acceleration, braking, and cornering substantially mimic, within limits, the actual drivers' behaviors, thereby providing a more familiar driving experience and instilling greater confidence in the self-driving vehicles.

Specific embodiments of the technology will now be described. The embodiments are intended to describe aspects of the present invention in sufficient detail to enable those skilled in the art to practice the present invention. Other embodiments may be utilized and changes may be made without departing from the scope of the present invention. The following detailed description is, therefore, not to be taken in a limiting sense. The scope of the present invention is defined only by the appended claims, along with the full scope of equivalents to which the claims are entitled.

Exemplary System

Referring particularly to FIG. 1, an exemplary embodiment of the system 10 is shown configured for managing the self-driving behavior of the self-driving vehicle 12. The system 10 may broadly comprise the communication element 20 configured to receive and transmit signals via a network 24, the memory element 18 configured to store information, and the processing element 16 electronically coupled to the communication element 20 and the memory element 18. The system 10 may be configured as a mobile device (e.g., a smart phone or tablet), removable device, or fixed device.

The communication element 20 may generally allow for communication with remote systems or devices, including remote databases 26 on which may be stored the pre-existing data. The communication element 20 may include signal or data transmitting and receiving circuits, such as antennas, amplifiers, filters, mixers, oscillators, digital signal processors (DSPs), and the like. The communication element 20 may establish communication wirelessly by utilizing radio-frequency (RF) signals and/or data that comply with communication standards such as cellular 2G, 3G, or 4G, IEEE 802.11 standard (such as WiFi), IEEE 802.16 standard (such as WiMAX), Bluetooth™, or combinations thereof. The communication element 20 may be electronically coupled or otherwise in electronic communication with the memory element 18 and the processing element 16.

The network 24 may be embodied by a local, metro, or wide area network (LAN, MAN, or WAN) and may be formed using a plurality of known architectures and topologies. In some embodiments, a portion of the network 24 may be formed by at least a portion of the Internet, by communication lines that are leased from other entities, or by combinations thereof. The network 24 may be implemented within a small area such as city or across a larger area such as a region or country.

The memory element 18 may generally allow for storing information, such as the collected data, accessed pre-existing data, and/or performance thresholds or other custom controls. The memory element 18 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 18 may include, or may constitute, a "computer-readable medium." The memory element 18 may store the instructions, code, code segments, software, firmware, programs, applications, apps, services, daemons, or the like that are executed by the processing element 16. The memory element 18 may also store settings, data, documents, sound files, photographs, movies, images, databases, and the like. The memory element 18 may be electronically coupled or otherwise in electronic communication with the communication element 20 and the processing element 16.

The processing element 16 may generally allow for creating the performance thresholds or other custom controls. The processing element 16 may include one or more processors, microprocessors, microcontrollers, DSPs, field-programmable gate arrays (FPGAs), analog and/or digital application-specific integrated circuits (ASICs), or the like, or combinations thereof. The processing element 16 may generally execute, process, or run instructions, code, code segments, software, firmware, programs, applications, apps, processes, services, daemons, or the like. The processing element 16 may also include hardware components such as finite-state machines, sequential and combinational logic, and other electronic circuits that can perform the functions necessary for the operation of embodiments of the current inventive concept. The processing element 16 may be in communication with the other electronic components through serial or parallel links that include address busses, data busses, control lines, and the like. The processing element 16 may be electronically coupled or otherwise in electronic communication with the communication element 20 and the memory element 18.

Referring again to FIG. 2, the various actions that may be performed by the system 10 may broadly include the following. The processing element 16 may collect data regarding the actual driving behavior of the driver in the manual driving mode, as shown in step 100. The processing element 16 may access pre-existing data via the communication element 20 regarding the actual driving behavior of the driver in the manual driving mode, as shown in step 102. The processing element 16 may combine the collected data and the accessed pre-existing data, and store the combined data in the memory element 18, as shown in step 104. The processing element 16 may create the performance threshold or other custom control based upon the combined data, and store the custom control in the memory element 18, as shown in step 106. The processing element 16 may apply the performance threshold or other custom control to manage the self-driving behavior of the self-driving vehicle 12 in the self-driving mode, as shown in step 108. The processing element 16 may continue to collect additional data regarding the actual driving behavior of the driver in the manual driving mode, and store the collected additional data in the memory element 18, as shown in step 110. The processing element 16 may adjust the custom control based upon the collected additional data, as shown in step 112.

The system 10 may include additional, fewer, or alternative components and/or perform additional, fewer, or alternative actions, including those discussed elsewhere herein, and particularly the additional features discussed in the section describing the computer-implemented method.

Exemplary Computer-Implemented Method

Figure 3:
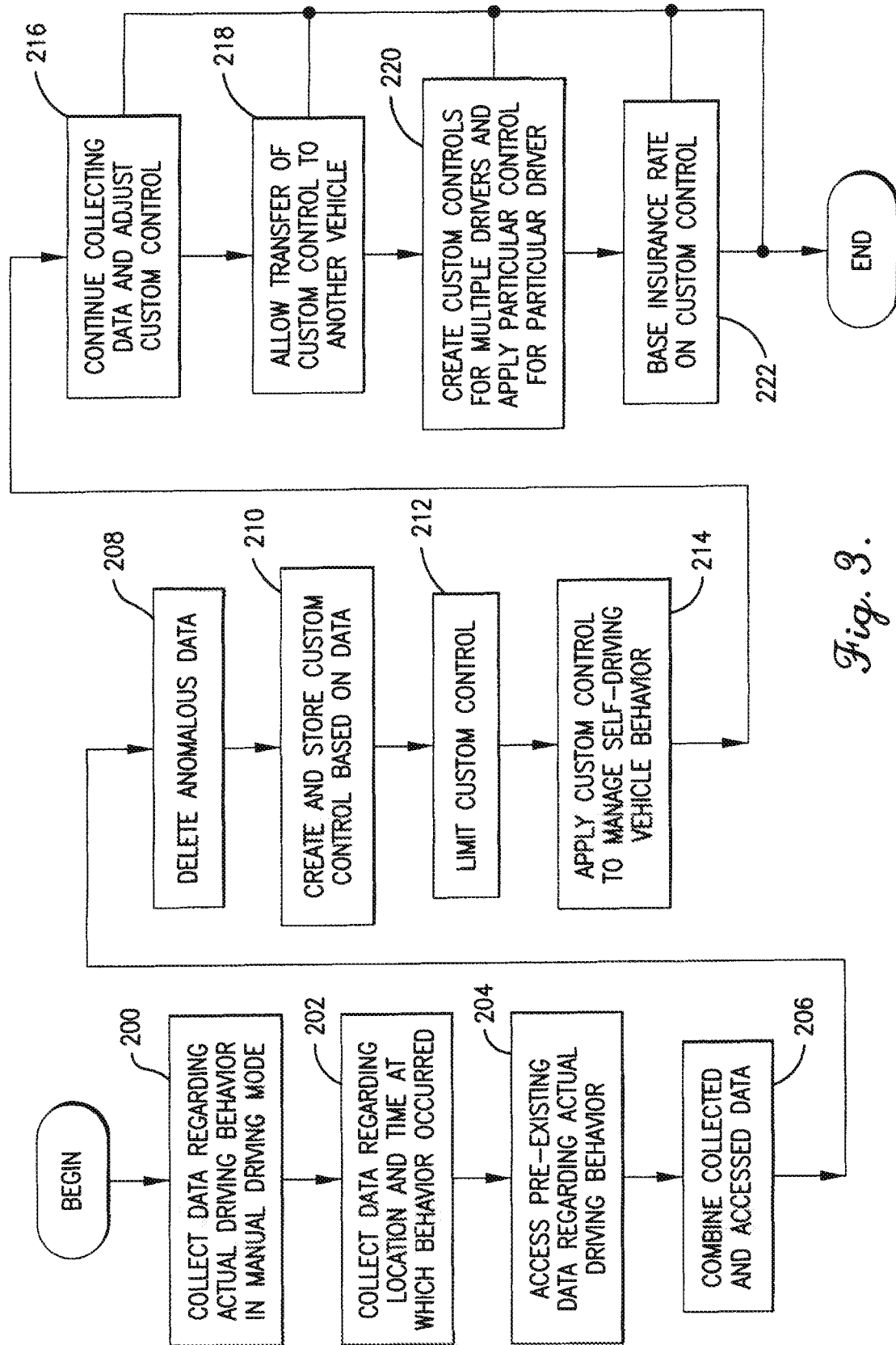
FIG. 3 is a second flowchart of exemplary steps or actions that may be performed by the system of FIG. 1.

Referring also to FIG. 3, an exemplary computer-implemented method is shown for managing the self-driving behavior of the self-driving vehicle 12. The method may broadly include the following steps or actions. Data may be collected regarding an actual driving behavior of a driver in a manual driving mode, as shown in step 200. The actual driving behavior may include acceleration, deceleration, lane-changing, speed of cornering, and speed management. In one implementation, one or more sensors may be used to measure the actual driving behavior. In one implementation, the collected data may include a location and/or a time at which the measured actual driving behavior occurred, as shown in step 202. Pre-existing data may be accessed regarding the actual driving behavior of the driver in the manual driving mode, as shown in step 204. The collected data and the accessed pre-existing data may be combined, as shown in step 206. In one implementation, anomalous data may be deleted from the combined data in order to better represent the driver's normal driving behavior, as shown in step 208.

A custom control may be created based upon the combined data, as shown in step 210. In one implementation, the custom control may be a performance threshold for the self-driving behavior (e.g., maximum and/or minimum acceleration and/or decelerations rates). In one implementation, the custom control may not be allowed to exceed a limit, as shown in step 212. The limit may be based upon information such as driving conditions, driving circumstances, driving laws, parental preferences, employer preferences, and/or vehicle owner preferences. In one implementation, the limit may be determined by collecting driving behavior data of a plurality of drivers driving through a particular area at a particular time, determining a safe operating range for driving through the particular area at the particular time based upon the collected driving behavior data of the plurality of drivers, and basing the limit on the determined safe operating range.

The custom control may be applied to manage the self-driving behavior of the self-driving vehicle 12 in a self-driving mode, as shown in step 214. In one implementation, applying the custom control may include identifying a change in the actual driving behavior of the driver in the manual driving mode associated with a particular location and/or a particular time, and adjusting the custom control to reflect the change in the actual driving behavior of the driver when the self-driving vehicle 12 is operating in the self-driving mode at the particular location and/or at the particular time.

Additional data may continue to be collected regarding the actual driving behavior of the driver in the manual driving mode, and the custom control may be adjusted based upon the collected additional data, as shown in step 216. The custom control may be adjusted periodically or continuously.

In various implementations, the method may further include any one or more of the following additional steps or actions. The driver may be allowed to transfer the custom control from the self-driving vehicle 12 to a second self-driving vehicle, as shown in step 218. A plurality of custom controls may be created for a plurality of different drivers of the self-driving vehicle 12, with each custom control being associated with each different driver, and a particular driver using the self-driving vehicle 12 may be identified from the plurality of different drivers, and a particular custom control associated with the identified particular driver may be applied from the plurality of custom controls, as shown in step 220. An insurance rate may be based upon the custom control for the self-driving vehicle 12, as shown in step 222. In one implementation, the driver may be allowed to manually adjust the custom control to reflect a lower or higher rate of driving aggressiveness, and the insurance rate may be based upon the manually adjusted custom control and an amount of time spent in the self-driving mode.

The computer-implemented method may include additional, fewer, or alternative features, including those discussed elsewhere herein.

Exemplary Computer-Readable Medium

A non-transitory computer-readable medium with an executable program stored thereon may be provided for managing the self-driving behavior of the self-driving vehicle 12. The program may instruct the processing element 16 and/or other components of the system 10 to perform various actions which may include the following. Referring again to FIG. 2, the program may instruct the processing element 16 to collect data regarding the actual driving behavior of the driver in the manual driving mode, as shown in step 100. The program may instruct the processing element 16 to access pre-existing data via the communication element 20 regarding the actual driving behavior of the driver in the manual driving mode, as shown in step 102. The program may instruct the processing element 16 to combine the collected data and the accessed pre-existing data, and to store the combined data in the memory element 18, as shown in step 104. The program may instruct the processing element 16 to create the performance threshold or other custom control based upon the combined data, and store the custom control in the memory element 18, as shown in step 106. The program may instruct the processing element 16 to apply the custom control to manage the self-driving behavior of the self-driving vehicle 12 in the self-driving mode, as shown in step 108. The program may instruct the processing element 16 to continue to collect additional data regarding the actual driving behavior of the driver in the manual driving mode, and store the collected additional data in the memory element 18, as shown in step 110. The program may instruct the processing element 16 to adjust the custom control based upon the collected additional data, as shown in step 112.

The executable program stored on the non-transitory computer-readable medium may instruct the system 10 to perform additional, fewer, or alternative actions, including those discussed elsewhere herein, and particularly the additional features discussed in the section describing the computer-implemented method.

Exemplary Computer-Implemented Method

Figure 4:
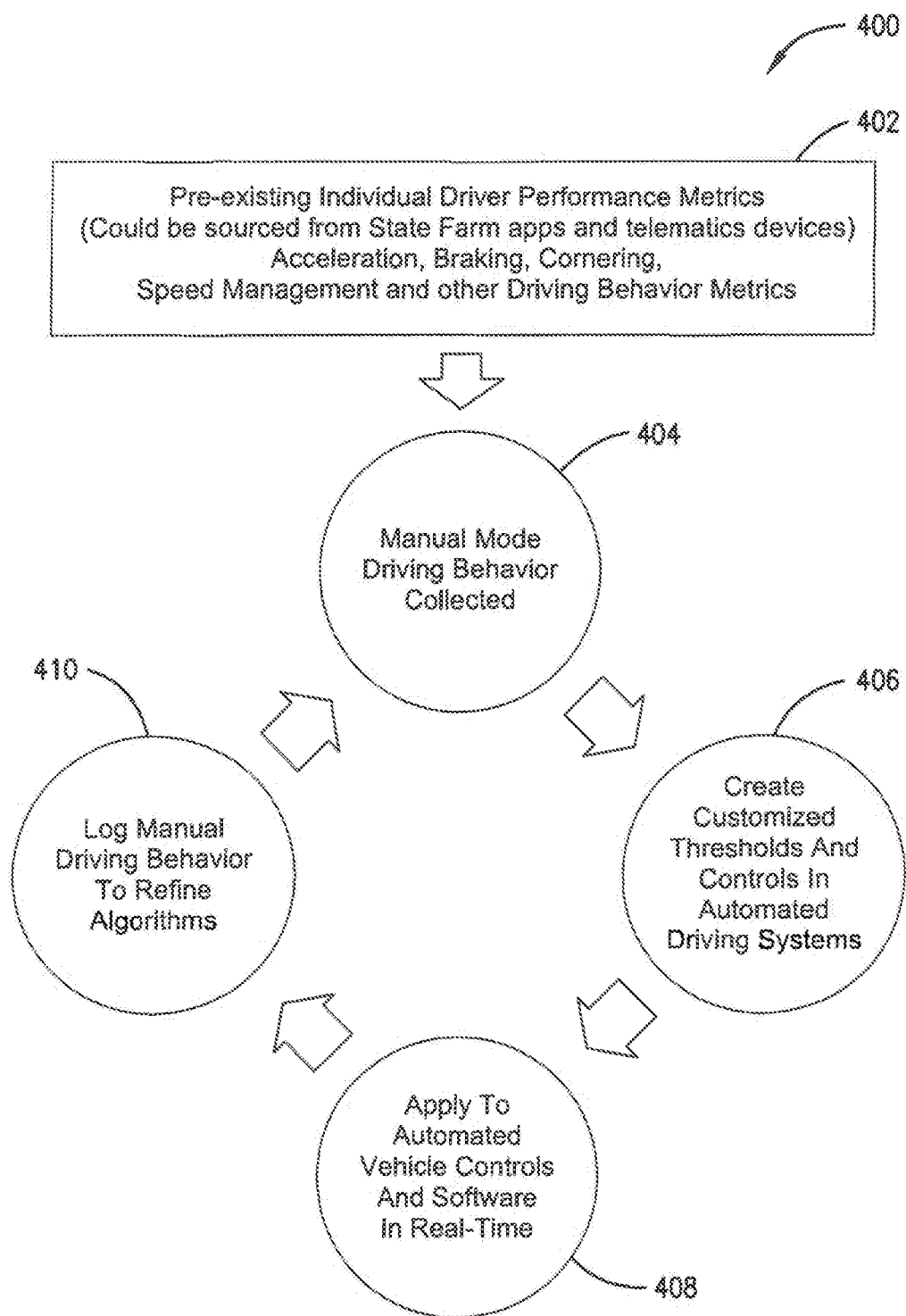
FIG. 4 depicts an exemplary computer-implemented method of using driving performance metrics as an input to an autonomous or semi-autonomous vehicle control system for natural driving (or to mimic an individual driver's actual driving behavior)

FIG. 4 depicts an exemplary computer-implemented method of using driving performance metrics as an input to automated (e.g., autonomous or semi-autonomous) vehicle control systems for natural driving (or to mimic an individual driver's actual driving behavior) 400. The method 400 may include gathering individual driver performance data or metrics, as shown in step 402; collecting driving behavior data in a manual driving mode, as shown in step 404; creating customized thresholds and controls for use in automated vehicle driving systems as shown in step 406; applying the customized thresholds to automated vehicle control systems and/or software, such as in real-time or real world driving, as shown in step 408; and/or logging manual driving behavior to further refine the algorithms and/or customized thresholds, as shown in step 410. The method may include additional, less, or alternate actions, including those discussed elsewhere herein, and/or the method may be implemented via a computer system, communication network, one or more processors, and/or computer-executable instructions stored on non-transitory storage media or computer-readable medium.

The method 400 may include gathering pre-existing (or historical) individual driver performance data or metrics, as shown in step 402. For example, driver behavior or telematics data may be collected from insurance provider telematics applications used on mobile devices and/or via dedicated telematics devices. The pre-existing driving performance or driving behavior data may relate to acceleration, braking, cornering, speed management, following distance, and/or other driving behavior metrics, including those discussed elsewhere herein. The pre-existing telematics and/or driver behavior data may be collected after the insured or other driver provides their affirmative consent or opts-in into an auto insurance discount program intended to benefit safe driving behavior The pre-existing data may also include driving scores (such as scores for individual driving characteristics) for individual trips that an individual has driven in the past.

The method 400 may include collecting driving behavior (and/or telematics) data in a manual driving mode (i.e., a human is driving the vehicle), as shown in step 404. The driving behavior data may be collected via a smart vehicle controller or processor, or a via a telematics data collection application running on a mobile device (e.g., smart phone, smart watch, smart glasses, etc.). The driving behavior data collected may relate to acceleration, braking, cornering, speed management, following distance, and/or other driving behavior metrics. The data collected in manual driving mode may be adjusted based upon the type of vehicle, such as sedan versus sport utility vehicle (SUV).

The method 400 may include creating customized thresholds and/or controls for use in automated vehicle driving systems, as shown in step 406. Customized thresholds and/or settings may be calculated based upon an individual's actual driving behavior. Customized thresholds and/or setting may be set for a variety of driving behavior characteristics that an automated vehicle is to mimic or replicate. The driving behavior characteristics may relate to acceleration, braking, cornering, speed management, following distance, braking, etc. The driving behavior characteristics may also be adjusted based upon the time of day, as certain drivers may exhibit different driving behavior during a morning commute as compared to an evening commute.

In one embodiment, a driver profile may be built to allow the automated or autonomous/semi-autonomous vehicle to mimic a specific driver's driving. Acceptable ranges for each driving behavior characteristic may be developed. The acceptable ranges be defined by upper and lower limits or thresholds. If the specific driver's actual driving behavior falls within the acceptable range for an individual driving behavior characteristic, then a setting for that specific driving behavior characteristic in a driver profile may be set to match the specific driver's actual driving behavior. On the other hand, if the specific driver's actual driving behavior falls outside the acceptable range for an individual driving behavior characteristic, then a setting for that specific driving behavior characteristic in the driver profile may be set to match the upper or lower limit or threshold for that characteristic.

The method 400 may include applying the customized thresholds to automated vehicle control systems and/or software, as shown in step 408. The customized thresholds (including the driver profile and/or driving characteristic settings mentioned directly above) may be electronically transferred to a vehicle control system or processor, such as a smart vehicle controller, via wireless communication and/or data transmission. After which, as the automated or autonomous vehicle drives on the road in real-time or in real world conditions, the customized thresholds may impact or influence the operation or driving of the automated vehicle.

The method 400 may include logging manual driving behavior to further refine the algorithms and/or customized thresholds, as shown in step 410. For example, the subsequent manual driving behavior or telematics data may be collected for an individual driver. The subsequent, or more recent, data collected may then be used to further refine the customized thresholds associated with automated driving characteristics. The refinements may facilitate tuning the algorithms and/or customized thresholds (and/or driver profile) to provide safe automated or autonomous vehicle driving while still mimicking actual driving of the driver.

In one aspect, driving behavior and/or telematics data may be collected. The data may segmented into (and/or scored for the driver for) several driving characteristics. If the driver's score for an individual driving characteristic is within an acceptable range, the driver's profile may be set to their score for that driving characteristic. If not, the driver's profile may be set to a threshold or limit for the driving characteristic that is pre-determined to be acceptable for safe driving. As a result of the foregoing, a driver profile may be built and programmed into an automated, autonomous, and/or semi-autonomous vehicle such that when an insured is traveling in the vehicle, it feels as a normal (or approximately normal) riding experience, while simultaneously ensuring road safety and safe autonomous/semi-autonomous vehicle operation.

Another Exemplary Computer-Implemented Method

Figure 5:
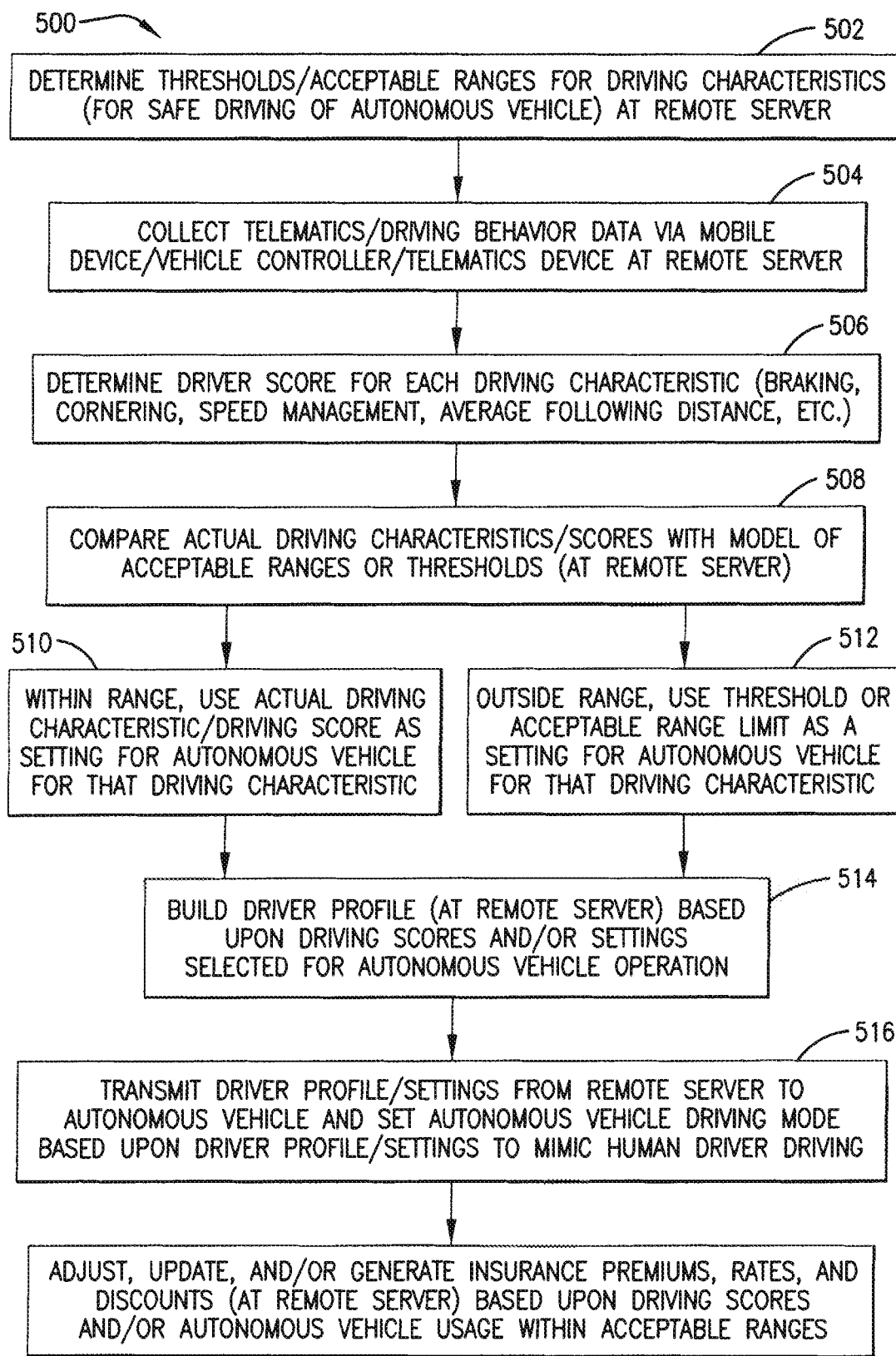
FIG. 5 depicts an exemplary computer-implemented method of programming an autonomous or semi-autonomous vehicle to exhibit actual driving behavior, and/or adjusting auto insurance based upon autonomous or semi-autonomous vehicle operation/usage and/or driving scores for an individual.

FIG. 5 depicts an exemplary computer-implemented method of programming an autonomous vehicle to mimic actual driving behavior and/or adjusting auto insurance based upon autonomous vehicle operation and/or driving scores 500. The method 500 may include (1) determining thresholds and/or acceptable driving ranges for safe driving for several driving characteristics, such as at an insurance provider remote server, as shown in step 502; (2) collecting actual driving behavior and/or telematics data (for the several driving characteristics) for an individual, such as via a mobile device or vehicle controller in wireless communication and/or data transmission with the insurance provider remote server, as shown in step 504; (3) determining a driving score for the driver for each of the several driving characteristics based upon the actual driving behavior and/or telematics data collected (such as at the insurance provider remote server), as shown in step 506; and/or (4) comparing the driving score for the driver for each of the several driving characteristics based upon the actual driving behavior and/or telematics data (for the several driving characteristics) with the individual thresholds and/or acceptable driving ranges for safe driving (such as at the insurance provider remote server), as shown in step 508.

The method 500 may also include, at the remote server, (5) if the driving score for each driving characteristics is within the threshold and/or acceptable driving range, then determining a setting within a driver profile for the driver and/or for that driving characteristic based upon the driving score, as shown in step 510; and/or (6) if the driving score for each driving characteristics is not within the threshold and/or acceptable driving range, then determining a setting within a driver profile for the driver and/or for that driving characteristic based upon the threshold and/or acceptable driving range (such as an upper or lower limit), as shown in step 512. The method 500 may also include generating or building, at the remote server, a driver profile based upon the settings established (i.e., the settings established based upon the driver score and/or the threshold and/or acceptable driving range), as shown in step 514. The method 500 may also include programming an autonomous vehicle or vehicle controller to automatically drive a vehicle based upon the driver profile and/or settings established based upon actual driver behavior and/or acceptable limits or thresholds for safe driving, as shown in step 516. For instance, the driver profile may be uploaded to an autonomous vehicle controller via wireless communication and/or data transmission from the insurance provider remote server. As a result, a driver profile may be built and programmed into an autonomous vehicle such that when an insured is traveling in the autonomous vehicle, the riding experience is enhanced, while simultaneously ensuring road safety and safe autonomous vehicle operation.

The method 500 may also include adjusting or generating, such as via the insurance provider remote server, an auto insurance policy, premium, or discount based upon the driving score for each driving characteristic determined from the data collected, and/or for each driving score for an insured that is within an acceptable range for safe vehicle operation, as shown in step 518. The premium or discount may also be adjusted based upon an amount of autonomous vehicle usage in different modes of operation, as discussed elsewhere herein.

The method 500 may also include transmitting (from the insurance provider remote server) and/or presenting updated auto insurance policies, premiums, and/or discounts to an insured, such as via their mobile device, for the insured's review, modification, and/or approval. The method may include additional, less, or fewer actions, including those discussed elsewhere herein, and/or the method may be implemented via a computer system, remote servers, local vehicle processors or mobile devices, wireless communication network, and/or computer-executable instructions stored on non-transitory storage media or computer-readable medium.

Exemplary Methods of Mimicking Driver Behavior

In one aspect, a computer-implemented method of mimicking actual behavior for autonomous vehicle operation may be provided. The method may include: (1) determining an acceptable range for safe driving for each of one or more driving characteristics (e.g., acceleration, braking, cornering, speed management, following distance, etc.), via one or more processors; (2) collecting, gathering, or generating, via one or more processors, actual driving behavior and/or telematics data for an individual driver (such as via a telematics data collection application running on their mobile device or a dedicated telematics device); (3) determining a driving score for each of the one or more driving characteristics, via one or more processors, for the individual driver based upon computer analysis of the actual driving behavior and/or telematics data collected, gathered, or generated; (4) comparing the driving score with the acceptable range for each of the one or more driving characteristics, via one or more processors; (5) if the driving score for an individual driving characteristic is within the corresponding acceptable range (for that driving characteristic), determining, via one or more processors, a setting for that individual driving characteristic for use in a driver profile for the individual driver based upon that driving score, and if the driving score for an individual driving characteristics is outside of the corresponding acceptable range (for that driving characteristic), establishing, via one or more processors, a setting for that individual driving characteristic for use in the driver profile for the individual driver based upon an upper or lower limit (that is acceptable for safe driving) for the acceptable range; (6) programing, such as via one or more processors, an autonomous vehicle to drive during real world or real road conditions based upon the driver profile developed and/or the settings for the one or more driving characteristics (that may be within acceptable ranges or set at upper or lower limits of acceptable driving behavior); and/or (7) directing or controlling, via one or more processors, the autonomous vehicle to drive in accordance with the driver profile developed and/or settings determined to facilitate simultaneously operating the autonomous vehicle (i) to mimic the actual driving behavior of the human passenger, and (ii) within acceptable limits or otherwise safely.

The method may include additional, less, or fewer actions, including those discussed elsewhere herein, and/or the method may be implemented via a computer system, remote servers, local vehicle processors or mobile devices, wireless communication network, and/or computer-executable instructions stored on non-transitory storage media or computer-readable medium. For example, the method may include adjusting or updating, via one or more processors, an auto insurance policy, premium, or discount based upon the driver profile and/or the driving score for each of the one or more driving characteristics for an insured. Additionally or alternatively, the method may include adjusting or updating, via one or more processors, an auto insurance policy, premium, or discount based upon an amount of autonomous vehicle usage or miles driven in accordance with the driver profile and/or settings determined based upon the driver behavior data associated with an insured.

In another aspect, a computer-implemented method of adjusting operation of an autonomous or semi-autonomous vehicle may be provided. The method may include (1) collecting telematics data at an insurance provider remote server or associated transceiver, the telematics data being generated by a mobile device, a dedicated telematics device, and/or a vehicle processor or controller; (2) adjusting, at the remote server, an autonomous vehicle operational virtual setting or a driver profile for an insured based upon the telematics data to change autonomous vehicle operation to more closely mimic the actual driving behavior or characteristics of the insured; and/or (3) transmitting, from the remote server or associated transceiver, the adjusted autonomous vehicle operational virtual setting or driver profile to an autonomous vehicle controller or transceiver (via wireless communication and/or data transmission) for uploading or downloading, and/or use by the autonomous vehicle controller such that the autonomous vehicle is driven under processor control in a manner that more resembles the driving behavior of the insured to facilitate an enhanced traveling experience.

The method may include additional, less, or fewer actions, including those discussed elsewhere herein, and/or the method may be implemented via a computer system, remote servers, local vehicle processors or mobile devices, wireless communication network, and/or computer-executable instructions stored on non-transitory storage media or computer-readable medium. For instance, the method may include generating, at the remote server, acceptable ranges for each of several driving characteristics (e.g., braking, speed, cornering, acceleration) for autonomous vehicle operation; and/or comparing, at the remote server, the telematics data (and/or driving characteristic scores for each driving characteristic for the insured that are generated from or otherwise based upon the telematics data) collected with the acceptable ranges. If a driving characteristic score is within the acceptable range a virtual setting for autonomous vehicle operation is adjusted to, or set based upon, the driving characteristic score reflecting actual driving behavior of the insured, and/or if the driving characteristic score is not within the acceptable range a virtual setting for autonomous vehicle operation is adjusted to within, or set based upon, the acceptable range for the driving characteristic.

The method may include adjusting or generating, at the remote server, an insurance policy, premium, or discount based upon the driving characteristic score for an insured, and/or an amount of autonomous vehicle usage with differing virtual settings for autonomous vehicle operation. The method may further include, based upon the acceptable ranges of driving characteristics, developing multiple driving modes for an autonomous vehicle operation (e.g., conservative, normal, aggressive, My Profile) at a remote server; transmitting the multiple driving modes from the remote server or associated transceiver to an autonomous vehicle controller or associated transceiver; displaying the multiple driving modes on a display associated with the autonomous vehicle controller, and/or accepting user selection, via the display, of a driving mode in which the autonomous vehicle is to be driven under processor control and/or otherwise altering autonomous vehicle operation based upon the user selected driving mode.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity or group of tangible entities, be that entities that are physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time. Moreover, the "processing element" may, unless more narrowly described, consist of multiple separate tangible pieces of hardware for operating in the described manner to perform certain operations described herein.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "bas," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although embodiments of the present inventive concept have been described with reference to the illustrations in the attached drawing figures, it is noted that equivalents may be employed and substitutions made herein without departing from the scope of the present inventive concept as recited in the claims. Having thus described various embodiments of the present inventive concept, what is claimed as new and desired to be protected by Letters Patent includes the following:

We claim:

1. A computer-implemented method for managing self-driving behavior of a self-driving vehicle, the method implemented using a computer system including one or more processors in communication with one or more memory devices, the method comprising:
  receiving, by the one or more processors, manual mode driving data regarding an actual driving behavior of a first driver in a manual driving mode;
  receiving, by the one or more processors, safe operating range data, wherein the safe operating range data includes data regarding actual driving behavior of one or more drivers different than the first driver;
  creating, by the one or more processors, a custom control defining a vehicle behavior threshold based upon the manual mode driving data, including limiting the vehicle behavior threshold based upon the safe operating range data; and
  controlling the self-driving behavior of the self-driving vehicle using the custom control.

2. The computer-implemented method of claim 1, wherein:
  receiving the manual mode driving data includes receiving data regarding the actual driving behavior of the first driver associated with a particular location;
  receiving the safe operating range data includes receiving data associated with the particular location; and
  creating the custom control includes creating a custom control for the particular location based upon the actual driving behavior of the first driver associated with the particular location and the safe operating range data associated with the particular location.

3. The computer-implemented method of claim 2, wherein the safe operating range data associated with the particular location includes data regarding actual driving behavior of one or more drivers different than the first driver and associated with the particular location.

4. The computer-implemented method of claim 1, wherein:
  receiving the manual mode driving data includes receiving data regarding the actual driving behavior of the first driver associated with a particular time;

receiving the safe operating range data includes receiving data associated with the particular time; and creating the custom control includes creating a custom control for the particular time based upon the actual driving behavior of the first driver associated with the particular time and the safe operating range data associated with the particular time.

5. The computer-implemented method of claim 4, wherein the safe operating range data associated with the particular time includes data regarding actual driving behavior of one or more drivers different than the first driver and associated with the particular time.

6. The computer-implemented method of claim 4, wherein:

receiving the manual mode driving data includes receiving data regarding the actual driving behavior of the first driver associated with a particular location;

receiving the safe operating range data includes receiving data associated with the particular location; and creating the custom control includes creating a custom control for the particular location based upon the actual driving behavior of the first driver associated with the particular location and the safe operating range data associated with the particular location.

7. The computer-implemented method of claim 1, further comprising controlling the self-driving behavior of the self-driving vehicle in the self-driving mode, using the custom control, while the first driver is an occupant of the self-driving vehicle.

8. The computer-implemented method of claim 1, wherein the manual mode driving data comprises telematics data regarding the actual driving behavior of the first driver.

9. The computer-implemented method of claim 1, further comprising adjusting an insurance rate based upon the custom control.

10. A computer system for managing self-driving behavior of a self-driving vehicle, the computer system comprising one or more processors in communication with one or more memory devices, wherein the computer system is configured to:

receive manual mode driving data regarding an actual driving behavior of a first driver in a manual driving mode;

receive safe operating range data, wherein the safe operating range data includes data regarding actual driving behavior of one or more drivers different than the first driver;

create a custom control defining a vehicle behavior threshold based upon the manual mode driving data, including limiting the vehicle behavior threshold based upon the safe operating range data; and control self-driving behavior of a self-driving vehicle based upon the custom control.

11. The computer system of claim 10, wherein the computer system is configured to:

receive the manual mode driving data including data regarding the actual driving behavior of the first driver associated with a particular location;

receive the safe operating range data including data associated with the particular location; and create the custom control including a custom control for the particular location based upon the actual driving behavior of the first driver associated with the particular location and the safe operating range data associated with the particular location.

12. The computer system of claim 11, wherein the safe operating range data associated with the particular location includes data regarding actual driving behavior of one or more drivers different than the first driver and associated with the particular location.

13. The computer system of claim 10, wherein the computer system is configured to:

receive the manual mode driving data including data regarding the actual driving behavior of the first driver associated with a particular time;

receive the safe operating range data including data associated with the particular time; and create the custom control including a custom control for the particular time based upon the actual driving behavior of the first driver associated with the particular time and the safe operating range data associated with the particular time.

14. The computer system of claim 13, wherein the safe operating range data associated with the particular time includes data regarding actual driving behavior of one or more drivers different than the first driver and associated with the particular time.

15. The computer system of claim 13, wherein the computer system is configured to:

receive the manual mode driving data including data regarding the actual driving behavior of the first driver associated with a particular location;

receive the safe operating range data including data associated with the particular location; and create the custom control including a custom control for the particular location based upon the actual driving behavior of the first driver associated with the particular location and the safe operating range data associated with the particular location.

16. The computer system of claim 10, wherein the computer system is further configured to control the self-driving behavior of the self-driving vehicle in the self-driving mode, using the custom control, while the first driver is an occupant of the self-driving vehicle.

17. The computer system of claim 10, wherein the manual mode driving data comprises telematics data regarding the actual driving behavior of the first driver.

18. The computer system of claim 10, wherein the computer system is further configured to adjust an insurance rate based upon the custom control.

\* \* \* \* \*